United States Patent
Wu et al.

(10) Patent No.: US 10,710,906 B2
(45) Date of Patent: Jul. 14, 2020

(54) METHOD FOR TREATMENT OF PETROCHEMICAL SPENT CAUSTIC WASTEWATER

(71) Applicant: SHANDONG CHAMBROAD PETROCHEMICALS CO., LTD., Shandong (CN)

(72) Inventors: Yuqiang Wu, Shandong (CN); Bo Luan, Shandong (CN); Yaowei Wang, Shandong (CN)

(73) Assignee: Shandong Chambroad Petrochemicals Co., Ltd., Shandong (CN)

( * ) Notice: Subject to any disclaimer, the term of this patent is extended or adjusted under 35 U.S.C. 154(b) by 211 days.

(21) Appl. No.: 15/756,145

(22) PCT Filed: Jul. 24, 2017

(86) PCT No.: PCT/CN2017/094092
§ 371 (c)(1),
(2) Date: Feb. 28, 2018

(87) PCT Pub. No.: WO2018/133356
PCT Pub. Date: Jul. 26, 2018

(65) Prior Publication Data
US 2019/0023588 A1    Jan. 24, 2019

(30) Foreign Application Priority Data

Jan. 18, 2017  (CN) .......................... 2017 1 0037393

(51) Int. Cl.
| | | |
|---|---|---|
| C02F 1/30 | (2006.01) | |
| C02F 1/46 | (2006.01) | |
| C02F 1/72 | (2006.01) | |
| C02F 1/66 | (2006.01) | |
| C02F 103/36 | (2006.01) | |

(52) U.S. Cl.
CPC .............. *C02F 1/30* (2013.01); *C02F 1/4608* (2013.01); *C02F 1/66* (2013.01); *C02F 1/725* (2013.01); *C02F 2103/365* (2013.01); *C02F 2305/10* (2013.01)

(58) Field of Classification Search
CPC .......... C02F 1/4608; C02F 1/30; C02F 1/725; C02F 1/66; C02F 2103/365; C02F 2209/06; C02F 2305/10; B01J 19/088; B01J 2219/0895
See application file for complete search history.

(56) References Cited

U.S. PATENT DOCUMENTS

2014/0305790 A1    10/2014   Deveau et al.

FOREIGN PATENT DOCUMENTS

| CN | 101302070 A | 11/2008 |
|---|---|---|
| CN | 101786757 A | 7/2010 |
| CN | 102553648 A | 7/2012 |
| CN | 103663788 A | 3/2014 |
| CN | 104053631 A | 9/2014 |
| CN | 105481049 A | 4/2016 |
| CN | 106277177 A | 1/2017 |
| JP | H09290165 A | 11/1997 |
| JP | H11290840 A | 10/1999 |
| JP | 2000167355 A | 6/2000 |
| JP | 2002153869 A | 5/2002 |

OTHER PUBLICATIONS

Chinese Office Action for Chinese Application No. 201710037393.7, dated Aug. 22, 2019, with translation, 13 pages 2019.
International Search Report issued in PCT/CN2017/094092 dated Oct. 10, 2017, 5 pages.

*Primary Examiner* — Lessanework Seifu
(74) *Attorney, Agent, or Firm* — RatnerPrestia

(57) ABSTRACT

The present disclosure relates to wastewater treatment, and more particularly to a method for treatment of petrochemical spent caustic wastewater. The method includes the following steps: a) adjusting the pH of petrochemical spent caustic wastewater to 7 to 12, standing, removing the organic layer, and obtaining the pretreated wastewater; b) activating a plasma reactor loaded with resin photocatalyst, passing the pretreated wastewater into the plasma reactor for treatment in the presence of oxygen, and obtaining the treated wastewater. The method provided by the present disclosure can effectively improve the COD removal rate of petrochemical spent wastewater, and the whole treatment process is carried out under normal temperature and normal pressure, with a simple process and the ability to realize continuous operation. The experimental results show that the COD removal rate of petrochemical spent caustic wastewater using the method provided by the present disclosure is above 98%.

10 Claims, No Drawings

METHOD FOR TREATMENT OF PETROCHEMICAL SPENT CAUSTIC WASTEWATER

CROSS REFERENCE TO RELATED APPLICATIONS

This application is the U.S. National Phase Application of PCT/CN2017/094092, filed Jul. 24, 2017, which claims the priority of Chinese Patent Application No. 201710037393.7, filed on Jan. 18, 2017, and titled with "METHOD FOR TREATMENT OF PETROCHEMICAL SPENT CAUSTIC WASTEWATER", and the disclosures of which are hereby incorporated by reference.

FIELD

The present disclosure relates to wastewater treatment, and more particularly to a method for treatment of petrochemical spent caustic wastewater.

BACKGROUND

In petrochemical refinery, acid-alkaline wash is carried out in the process of petroleum processing and product refining. Alkaline wash is to treat the petroleum products with a certain concentration of sodium hydroxide, which will remove impurities such as thiols, phenols, thioethers, naphthenic acids in the petroleum products, while the exhausted lye after wash becomes spent caustic wastewater. The COD values of the spent caustic wastewater are usually particularly high, up to hundreds of thousands. Sulfides, phenols and other substances in spent caustic wastewater are highly risky and toxic compounds, which are seriously harmful to both animals and plants. Direct wastewater discharge would not only be toxic to aquatic animals and plants, but also consume large amounts of oxygen dissolved in water, causing aquatic animals and plants to lose their habitats. Therefore, spent caustic wastewater must be effectively treated; otherwise it will cause serious damage to the environment.

At present, the methods for treating petrochemical spent caustic wastewater mainly include incineration process, oxidation-reduction process, supercritical water oxidation process, wet air oxidation process, mild wet air oxidation process, catalytic wet air oxidation process, biological method, ultrasonic method and so on, wherein catalytic wet air oxidation process is the most widely used among all the oxidation processes. Catalytic wet air oxidation process is to oxidize and decompose organic matter and ammonia in wastewater into harmless substances such as $CO_2$, $H_2O$, $N_2$ by air oxidation under the action of certain temperature, pressure and catalyst, so as to achieve the purpose of purification. Although the method can decrease the COD value of spent caustic wastewater effectively, due to high temperature and high pressure in wastewater treatment processes, the energy consumption of wastewater treatment is large and the requirement for the treatment equipment is high.

SUMMARY

In order to solve the above technical problems, an aspect of the present disclosure is a method for treating petrochemical spent caustic wastewater, which can effectively decrease the COD value of petrochemical spent caustic wastewater under normal temperature and normal pressure conditions.

The present disclosure provides a method for treating petrochemical spent caustic wastewater, comprising the following steps:

a) adjusting the pH of petrochemical spent caustic wastewater to 7 to 12, standing, removing the organic layer, and obtaining the pretreated wastewater;

b) activating a plasma reactor loaded with resin photocatalyst, passing the pretreated wastewater into the plasma reactor for treatment in the presence of oxygen, and obtaining the treated wastewater.

Preferably, the photocatalyst in the resin photocatalyst is one or more selected from the group consisting of titanium oxide, zinc oxide, silver phosphate, silver oxide, iron oxide, copper oxide, zirconium oxide, molybdenum oxide, silver and iron-bipyridine complex.

Preferably, the resin in the resin photocatalyst is one or more selected from the group consisting epoxy resin, phenol-formaldehyde resin, acrylic resin, unsaturated polyester resin, ion exchange resin, amino resin, silicone resin, polyamide resin, urea-formaldehyde resin, polyurethane resin and furan resin.

Preferably, the content of photocatalyst in the resin photocatalyst is 5 to 30 wt %.

Preferably, the particle size of the resin photocatalyst is 0.1 to 2 mm.

Preferably, in step b), the ratio of the flow rate of the pretreated wastewater to the loading volume of the resin photocatalyst is (5 to 150) mL/min:(10 to 200) mL.

Preferably, the plasma reactor is glow discharge plasma reactor, corona discharge plasma reactor, dielectric barrier discharge plasma reactor, radio frequency discharge plasma reactor, microwave discharge plasma reactor or gliding arc discharge plasma reactor.

Preferably, during the operation of plasma reactor, the power supply voltage is 50 to 150V, and the power supply current is 1 to 4 A.

Preferably, in step b), the ratio of the amount of oxygen per unit volume of pretreated wastewater to the COD value of the pretreated wastewater is (1 to 2):1.

Preferably, the COD value of the petrochemical spent caustic wastewater is 10000 to 100000 mg/L.

Compared with the prior art, the present disclosure provides a method for treating petrochemical spent caustic wastewater. The method provided by the present disclosure comprises the following steps: a) adjusting the pH of petrochemical spent caustic wastewater to 7 to 12, standing, removing the organic layer, and obtaining the pretreated wastewater; b) activating a plasma reactor loaded with resin photocatalyst, passing the pretreated wastewater into the plasma reactor for treatment in the presence of oxygen, and obtaining the treated wastewater. In the method provided by the present disclosure, the petrochemical spent caustic wastewater is subjected to pH adjustment first, so that a part of soluble organics in the wastewater is converted into water-insoluble organics. After the removal of organic phase, pretreated wastewater with relatively low COD is obtained. Then, by the synergistic action of plasma and resin photocatalyst the organics in the pretreated wastewater are efficiently decomposed, and the COD value of the pretreated wastewater is greatly reduced. The method provided by the present disclosure can efficiently improve the COD removal rate of petrochemical spent wastewater, and the whole treatment process is carried out under normal temperature and normal pressure, with simple process and the ability to realize continuous operation. The experimental results show that the COD removal rate of petrochemical spent caustic wastewater using the method provided by the present disclosure is above 98%.

DETAILED DESCRIPTION

The technical solutions in the embodiments of the present disclosure will be described clearly and completely herein in conjunction with the examples of the present disclosure. Apparently, the described embodiments are only a part of the embodiments of the present disclosure, rather than all the embodiments. Based on the embodiments in the present disclosure, all of other embodiments, made by one of ordinary skill in the art without any creative efforts, fall into the protection scope of the present disclosure.

The present disclosure provides a method for treating petrochemical spent caustic wastewater, comprising the following steps:

a) adjusting the pH of petrochemical spent caustic wastewater to 7 to 12, standing, removing the organic layer, and obtaining the pretreated wastewater;

b) activating a plasma reactor loaded with resin photocatalys, passing the pretreated wastewater into the plasma reactor for treatment in the presence of oxygen, and obtaining the treated wastewater.

In the present disclosure, the pH of the petrochemical spent caustic wastewater is adjusted first, wherein the petrochemical spent caustic wastewater is high chemical oxygen demand (COD) alkaline wastewater produced from alkaline wash during the process of petroleum processing and product refining in refinery. In an embodiment of the present disclosure, the COD value of the petrochemical spent caustic wastewater is 10000 to 100000 mg/L, specifically 59000 to 63000 mg/L, 57000 to 61000 mg/L, 49000 to 54000 mg/L, 51000 to 53000 mg/L, 47000 to 52000 mg/L or 42000 to 45000 mg/L. In the present disclosure, acid solution is preferably used to adjust the pH of petrochemical spent caustic wastewater, wherein the acid solution includes but not is limited to concentrated sulfuric acid. In the present disclosure, the adjusted pH of petrochemical spent caustic wastewater is 7 to 12, preferably 7 to 10, specifically 7.5, 8, 8.5, 9, 9.5 or 10. In the present disclosure, on one hand, pH adjustment of the wastewater can convert sulfide salts, naphthenate, sodium phenolate and other organic salts in the spent caustic wastewater into water-insoluble organics for subsequent removal; on the other hand, adjusting the pH of wastewater to weakly basic closed to neutral facilitates the follow-up catalytic degradation of the organics therein.

After pH adjustment, the wastewater is allowed to stand for a while, and then the wastewater is separated into an aqueous phase and an organic phase. In the present disclosure, the preferred standing time is ≥10 min, more preferably ≥20 min, most preferably ≥30 min. After removing the organic phase, the pretreated wastewater is obtained.

After obtaining the pretreated wastewater, the plasma reactor that is loaded with resin photocatalyst is activated, wherein the plasma reactor includes but is not limited to glow discharge plasma reactor, corona discharge plasma reactor, dielectric barrier discharge plasma reactor, radio frequency discharge plasma reactor, microwave discharge plasma reactor and gliding arc discharge plasma reactor. In the present disclosure, the resin photocatalyst comprises resin and photocatalyst loaded on the resin, in which the photocatalyst and resin are well combined. The resin has certain absorption capacity to organics in wastewater, therefore extending residence time of wastewater organics in the plasma reactor, and having the same fully decomposed under the action of plasma and photocatalyst. In the present disclosure, the photocatalyst includes but is not limited to one or more selected from titanium oxide, zinc oxide, silver phosphate, silver oxide, iron oxide, copper oxide, zirconium oxide, molybdenum oxide, silver and iron-bipyridine complex; the resin includes but is not limited to one or more selected from epoxy resin, phenol-formaldehyde resin, acrylic resin, unsaturated polyester resin, ion exchange resin, amino resin, silicone resin, polyamide resin, urea-formaldehyde resin, polyurethane resin and furan resin. Specifically, the resin is one or more selected from hydrogenated bisphenol A epoxy resin, type 203 phenol-formaldehyde resin, type 665 phenol-formaldehyde resin, JC-62 thermosetting acrylic resin, type A DC-191 unsaturated polyester resin, polystyrene series cation exchange resin, polystyrene series anion exchange resin, butyl etherified amino resin, silicone modified phenol-formaldehyde resin, PA46 resin, PA1010 resin, MUF-230 resin, TPU resin and CY-4 furan resin; the content of the photocatalyst in the resin photocatalyst is preferably 5 to 30 wt %, more preferably 8 to 25 wt %, specifically 10 wt %, 12 wt %, 18 wt % or 20 wt %; the particle size of the resin photocatalyst is preferably 0.1 to 2 mm, more preferably 0.2 to 1.5 mm, further more preferably 0.3 to 1.3 mm, most preferably 0.315 to 1.25 mm. In the present disclosure, the load of resin photocatalyst in the plasma reactor is dependent on the flow rate of the pretreated wastewater passing through the plasma reactor, the ratio of the flow rate of pretreated wastewater to load of resin photocatalyst is preferably (5 to 150) mL/min:(10 to 200) mL, more preferably (10 to 100) mL/min:(20 to 200) mL, specifically 10 mL/min:20 mL, 60 mL/min:80 mL, 100 mL/min:100 mL, 100 mL/min:150 mL, 100 mL/min:130 mL or 100 mL/min:200 mL.

In the present disclosure, activating the plasma reactor refers to turning on the power supply of the plasma reactor and adjusting the voltage and current to make the plasma reactor operate stably; wherein the power supply voltage is preferably 50 to 150V, more preferably 60 to 100V, specifically 60V, 70V, 80V, 90V or 100V; the power supply current is preferably 1 to 4 A, more preferably 2 to 3.5 A, specifically 2.4 A, 2.6 A, 2.7 A, 2.8 A, 2.9 A or 3.3 A.

After activating the plasma reactor, the pretreated wastewater is passed into the plasma reactor for treatment; wherein the flow rate of the pretreated wastewater in the plasma reactor is preferably 5 to 200 mL/min, more preferably 10 to 100 mL/min, specifically 10 mL/min, 60 mL/min or 100 mL/min; the residence time is preferably 5 to 40 min, specifically 8 min, 10 min, 15 min, 17 min, 24 min or 30 min. In the present disclosure, pretreated wastewater is passed into the plasma reactor in the presence of oxygen; the consumption of oxygen is dependent on the COD value of the pretreated wastewater. The preferred ratio of oxygen consumption per unit volume of pretreated wastewater to COD value of the pretreated wastewater is (1 to 2):1, specifically (1.1 to 1.6):1, (1.0 to 1.5):1, (1.1 to 1.9):1, (1.3 to 2.0):1, (1.2 to 1.6):1 or (1.1 to 1.7):1. In the present disclosure, it is preferable to supply the plasma reactor with oxygen by introducing air into the plasma reactor. In an embodiment provided by the present disclosure, aeration volume of air is preferably 200 to 2000 mL/min, more preferably 400 to 1500 mL/min, specifically 400 mL/min, 800 mL/min, 1100 mL/min or 1200 mL/min. In plasma reactor, plasma and resin photocatalyst act synergistically to oxidize and decompose the organics in pretreated wastewater, and substantially reduce the COD value of the pretreated water.

In the method provided by the present disclosure, the pH of the petrochemical spent caustic wastewater is adjusted first, so as to convert a part of soluble organics in the wastewater into water-insoluble organics, and the pretreated wastewater with relatively low COD is obtained after removal of organic phase; then plasma and resin photocatalyst act synergistically to efficiently decompose the organics in the pretreated wastewater and substantially reduce the COD value of the pretreated wastewater. The method provided by the present disclosure can effectively improve the COD removal rate of petrochemical spent wastewater, and the whole treatment process is carried out under normal temperature and normal pressure, with a simple process and the ability to realize continuous operation. The experimental results show that the COD removal rate of petrochemical spent caustic wastewater using the method provided by the present disclosure is above 98%.

For greater clarity, the present disclosure will be illustrated clearly in conjunction with the examples.

Example 1

(1) The petrochemical spent caustic wastewater from petrochemical industry, the COD value of which was measured to be 59000 to 63000 mg/L, was neutralized with concentrated sulfuric acid for pretreatment so as to adjust the pH to 7.5. After standing for 30 min for phase separation, the organic layer of the wastewater was removed and the treated aqueous phase was collected, to obtain the pretreated wastewater;

(2) 20 mL of 12 wt % silver oxide/styrene series cation exchange resin catalyst was loaded in a dielectric barrier plasma reactor, wherein the particle size of the catalyst was 0.315 to 1.25 mm. Air was introduced and the power supply was turned on, with the voltage adjusted to 60V and the current adjusted to 2.4 A, so as to make the plasma reactor work stably.

(3) The ratio of oxygen flux per unit volume of pretreated wastewater to the COD value of the pretreated wastewater was (1.1 to 1.6):1. After adjusting the air flow rate to 400 mL/min, the pretreated petrochemical spent caustic wastewater was passed into the plasma reactor at a flow rate of 10 mL/min, wherein the residence time of the pretreated wastewater in the plasma reactor was 8 min, and the petrochemical spent caustic wastewater was treated by the synergistic action of the plasma and resin photocatalyst.

The COD removal rate was calculated after the checking the COD value of the effluent from the plasma reactor, and the result was 98.3%.

Example 2

(1) The petrochemical spent caustic wastewater from petrochemical industry, the COD value of which was measured to be from 57000 to 61000 mg/L, was neutralized with concentrated sulfuric acid for pretreatment so as to adjust the pH to 7.5. After standing for 30 min for phase separation, the organic layer of the wastewater was removed and the treated aqueous phase was collected, to obtain the pretreated wastewater;

(2) 80 mL of 18 wt % silver phosphate/styrene series anion exchange resin catalyst was loaded in a dielectric barrier plasma reactor, wherein the particle size of the catalyst was 0.315 to 1.25 mm. Air was introduced and the power supply was turned on, with the voltage adjusted to 80V and the current adjusted to 2.7 A, so as to make the plasma reactor work stably.

(3) The ratio of oxygen flux per unit volume of pretreated wastewater to the COD value of the pretreated wastewater was (1.0 to 1.5):1. After adjusting the air flow rate to 800 mL/min, the pretreated petrochemical spent caustic wastewater was passed into the plasma reactor at a flow rate of 60 mL/min, wherein the residence time of the pretreated wastewater in the plasma reactor was 10 min, and the petrochemical spent caustic wastewater was treated by the synergistic action of the plasma and resin photocatalyst.

The COD removal rate was calculated after the checking the COD value of the effluent from the plasma reactor, and the result was 98.9%.

Example 3

(1) The petrochemical spent caustic wastewater from petrochemical industry, the COD value of which was measured to be 49000 to 54000 mg/L, was neutralized with concentrated sulfuric acid for pretreatment so as to adjust the pH to 8.0. After standing for 30 min for phase separation, the organic layer of the wastewater was removed and the treated aqueous phase was collected, to obtain the pretreated wastewater;

(2) 100 mL of 10 wt % zinc oxide/JC-62 thermosetting acrylic resin catalyst was loaded in a radio frequency discharge plasma reactor, wherein the particle size of the catalyst was 0.315 to 1.25 mm. Air was introduced and the power supply was turned on, with the voltage adjusted to 80V and the current adjusted to 2.9 A, so as to make the plasma reactor work stably.

(3) The ratio of oxygen flux per unit volume of pretreated wastewater to the COD value of the pretreated wastewater was (1.1 to 1.9):1. After adjusting the air flow rate to 1200 mL/min, the pretreated petrochemical spent caustic wastewater was passed into the plasma reactor at a flow rate of 100 mL/min, wherein the residence time of the pretreated wastewater in the plasma reactor was 15 min, and the petrochemical spent caustic wastewater was treated by the synergistic action of the plasma and resin photocatalyst.

The COD removal rate was calculated after the checking the COD value of the effluent from the plasma reactor, and the result was 99.1%.

Example 4

(1) The petrochemical spent caustic wastewater from petrochemical industry, the COD value of which was measured to be 51000 to 53000 mg/L, was neutralized with concentrated sulfuric acid for pretreatment so as to adjust the pH to 10.0. After standing for 30 min for phase separation, the organic layer of the wastewater was removed and the treated aqueous phase was collected, to obtain the pretreated wastewater;

(2) 150 mL of 10 wt % titanium oxide/polyamide resin (PA46) catalyst was loaded in a gliding arc discharge plasma reactor, wherein the particle size of the catalyst was 0.315 to 1.25 mm. Air was introduced and the power supply was turned on, with the voltage adjusted to 100V and the current adjusted to 3.3 A, so as to make the plasma reactor work stably.

(3) The ratio of oxygen flux per unit volume of pretreated wastewater to the COD value of the pretreated wastewater was (1.3 to 2.0):1. After adjusting the air flow rate to 1200 mL/min, the pretreated petrochemical spent caustic wastewater was passed into the plasma reactor at a flow rate of 100 mL/min, wherein the residence time of the pretreated wastewater in the plasma reactor was 30 min, and the petrochemical spent caustic wastewater was treated by the synergistic action of the plasma and resin photocatalyst.

The COD removal rate was calculated after the checking the COD value of the effluent from the plasma reactor, and the result was 98.9%.

Example 5

(1) The petrochemical spent caustic wastewater from petrochemical industry, the COD value of which was measured to be 47000 to 52000 mg/L, was neutralized with concentrated sulfuric acid for pretreatment so as to adjust the pH to 9.5. After standing for 30 min for phase separation, the organic layer of the wastewater was removed and the treated aqueous phase was collected, to obtain the pretreated wastewater;

(2) 130 mL of 20 wt % iron oxide/urea-formaldehyde (MUF-230) resin catalyst was loaded in a gliding arc discharge plasma reactor, wherein the particle size of the catalyst was 0.315 to 1.25 mm. Air was introduced and the power supply was turned on, with the voltage adjusted to 90V and the current adjusted to 2.8 A, so as to make the plasma reactor work stably.

(3) The ratio of oxygen flux per unit volume of pretreated wastewater to the COD value of the pretreated wastewater was (1.2 to 1.6):1. After adjusting the air flow rate to 1100 mL/min, the pretreated petrochemical spent caustic wastewater was passed into the plasma reactor at a flow rate of 100 mL/min, wherein the residence time of the pretreated wastewater in the plasma reactor was 17 min, and the petrochemical spent caustic wastewater was treated by the synergistic action of the plasma and resin photocatalyst.

The COD removal rate was calculated after the checking the COD value of the effluent from the plasma reactor, and the result was 99.3%.

Example 6

(1) The petrochemical spent caustic wastewater from petrochemical industry, the COD value of which was measured to be 42000 to 45000 mg/L, was neutralized with concentrated sulfuric acid for pretreatment so as to adjust the pH to 9.0. After standing for 30 min for phase separation, the organic layer of the wastewater was removed and the treated aqueous phase was collected, to obtain the pretreated wastewater;

(2) 200 mL of 15 wt % molybdenum oxide/polyamide resin (PA1010) was loaded in dielectric barrier plasma reactor, wherein the particle size of the catalyst was 0.315 to 1.25 mm. Air was introduced and the power supply was turned on, with the voltage adjusted to 90V and the current adjusted to 2.6 A, so as to make the plasma reactor work stably.

(3) The ratio of oxygen flux per unit volume of pretreated wastewater to the COD value of the pretreated wastewater was (1.1 to 1.7):1. After adjusting the air flow rate to 1100 mL/min, the pretreated petrochemical spent caustic wastewater was passed into the plasma reactor at a flow rate of 100 mL/min, wherein the residence time of the pretreated wastewater in the plasma reactor was 24 min, and the petrochemical spent caustic wastewater was treated by the synergistic action of the plasma and resin photocatalyst.

The COD removal rate was calculated after the checking the COD value of the effluent from the plasma reactor, and the result was 99.0%.

It could be seen from examples 1-6 that the present disclosure provides a method for treating petrochemical spent caustic wastewater and the application thereof, wherein the petrochemical spent caustic wastewater is treated by synergistic action of plasma and resin photocatalyst. The method can effectively improve the COD removal rate of petrochemical spent caustic wastewater up to 99.3%. The whole treatment process is carried out at normal temperature and normal pressure, with a simple process and the ability to realize continuous operation.

The above are only the preferred embodiments of the present disclosure, and it should be noted that one of ordinary skill in the art can make some improvements and modifications without departing from the principle of the present disclosure, and these improvements and modifications should be regarded within the protection scope of the present invention.

The invention claimed is:

1. A method for treating petrochemical spent caustic wastewater, comprising:
   a) adjusting the pH of petrochemical spent caustic wastewater to 7 to 12, standing, removing the organic layer, and obtaining the pretreated wastewater;
   b) activating a plasma reactor loaded with resin photocatalyst, passing the pretreated wastewater into the plasma reactor for treatment in the presence of oxygen, and obtaining the treated wastewater.

2. The method according to claim 1, wherein the photocatalyst in the resin photocatalyst is one or more selected from the group consisting of titanium oxide, zinc oxide, silver phosphate, silver oxide, iron oxide, copper oxide, zirconium oxide, molybdenum oxide, silver and iron-bipyridine complex.

3. The method according to claim 1, wherein the resin in the resin photocatalyst is one or more selected from the group consisting of epoxy resin, phenol-formaldehyde resin, acrylic resin, unsaturated polyester resin, ion exchange resin, amino resin, silicone resin, polyamide resin, urea-formaldehyde resin, polyurethane resin and furan resin.

4. The method according to claim 1, wherein the content of the photocatalyst in the resin photocatalyst is 5 to 30 wt %.

5. The method according to claim 1, wherein the particle size of the resin photocatalyst is 0.1 to 2 mm.

6. The method according to claim 1, wherein in step b), the ratio of the flow rate of the pretreated wastewater to the load of the resin photocatalyst is 5 to 150 mL/min:10 to 200 mL.

7. The method according to claim 1, wherein the plasma reactor is glow discharge plasma reactor, corona discharge plasma reactor, dielectric barrier discharge plasma reactor, radio frequency discharge plasma reactor, microwave discharge plasma reactor or gliding arc discharge plasma reactor.

8. The method according to claim 1, wherein during the operation process of the plasma reactor the power supply voltage is 50 to 150V, and the power supply current is 1 to 4 A.

9. The method according to claim 1, wherein in step b), the ratio of oxygen consumption per unit volume of pretreated wastewater to COD value of the pretreated wastewater is 1 to 2:1.

10. The method according to claim 1, wherein the COD value of the petrochemical spent caustic wastewater is 10000 to 100000 mg/L.

* * * * *